United States Patent [19]

Kaneko et al.

[11] Patent Number: 5,327,340
[45] Date of Patent: Jul. 5, 1994

[54] PRODUCTION ORDER DETERMINING METHOD

[75] Inventors: Kuniya Kaneko; Harumichi Wakiyama, both of Toyota; Tadasi Naito, Nagoya, all of Japan

[73] Assignee: Toyota Jidosha Kabushiki Kaisha, Toyota, Japan

[21] Appl. No.: 987,084

[22] Filed: Dec. 7, 1992

Related U.S. Application Data

[63] Continuation-in-part of Ser. No. 743,874, Aug. 12, 1991, abandoned.

[30] Foreign Application Priority Data

Aug. 23, 1990 [JP] Japan .................................. 2-220023

[51] Int. Cl.$^5$ .............................................. G06F 15/22
[52] U.S. Cl. ...................................... 364/401; 364/402; 364/468
[58] Field of Search ................................ 364/401–406, 364/408, 468

[56] References Cited

U.S. PATENT DOCUMENTS

4,459,663  7/1984  Dye ...................................... 364/403

Primary Examiner—Roy N. Envall, Jr.
Assistant Examiner—Frantzy Poinvil
Attorney, Agent, or Firm—Kenyon & Kenyon

[57] ABSTRACT

A method for controlling a production apparatus includes steps of providing production information in the form of a specified production time period with respect to a plurality of product types, calculating a production expectation value for each specified production time period, summing the production expectation values for each specified production time period for all the product types and then integer-processing the total number of product portions to be produced each day, providing each day with as many production orders as the integer-processed number of product portions to be produced on that day, and then determining by an average process what product type should be produced in each production order.

9 Claims, 6 Drawing Sheets

FIG. 1

| TYPE OF PRODUCTS \ DAY | 1 | 2 | 3 | 4 | 5 |
|---|---|---|---|---|---|
| A | ○—ONE|BOX—○ ○———ONE|BOX———○ | | | ○——ONE|BOX——○ | |
| B | ○———ONE|BOX———————○ | | | | |
| C | ○———ONE|BOX———○ ○———ONE|BOX———○ | | | | |

FIG. 2

| TYPE OF PRODUCTS \ DAY | 1 | 2 | 3 | 4 | 5 |
|---|---|---|---|---|---|
| A | ○—0.5 | 0.5—○ | | | |
| | ○—0.25 | 0.25 | 0.25 | 0.25—○ | |
| | | | | ○—0.5 | 0.5—○ |
| B | ○—0.2 | 0.2 | 0.2 | 0.2 | 0.2—○ |
| C | ○—0.25 | 0.25 | 0.25 | 0.25—○ | |
| | | ○—0.25 | 0.25 | 0.25 | 0.25—○ |

FIG. 3

| TYPE OF PRODUCTS \ DAY | 1 | 2 | 3 | 4 | 5 |
|---|---|---|---|---|---|
| A | 0.5 / 0.25 | 0.5 / 0.25 | 0.25 | 0.25 / 0.5 | 0.5 |
| B | 0.2 | 0.2 | 0.2 | 0.2 | 0.2 |
| C | 0.25 | 0.25 / 0.25 | 0.25 / 0.25 | 0.25 / 0.25 | 0.25 |
| SUMMATION | 1.2 | 1.45 | 0.95 | 1.45 | 0.95 |
| INTEGER-PROCESSING | 1 | 2 | 1 | 1 | 1 |

FIG. 4

| DAY / TYPE OF PRODUCTS | 1 | 2 | 3 | 4 | 5 | 6 |
|---|---|---|---|---|---|---|
| A | 0.75 | 0.3 | 1.05 | −0.15 | 0.6 | 1.1 |
| B | 0.2 | 0.4 | 0.6 | 0.8 | 0.05 | 0.25 |
| C | 0.25 | 0.75 | −0.2 | 0.3 | 0.8 | −0.4 |
| PRODUCTION ORDER | A | C | A | B | C | A |

PRODUCTION ORDER DETERMINING METHOD

This application is a continuation-in-part of U.S. application Ser. No. 07/743,874 which was filed Aug. 12, 1991 now abandoned.

BACKGROUND OF THE INVENTION

1. Field of the Invention

The present invention relates to a production order determining method for determining a production order of a plurality of production types of products in a production line where a production information is given in the form of specified periods of time of production with respect to production types of products.

2. Description of the Prior Art

Japanese Patent Publication SHO 63-265791 discloses a method for determining a production order of different models or production types of engines, in an engine assembly line, which are to be supplied to different car assembly lines. In the prior art method, the production order of the different production types of engines at the engine assembly line is determined based on input requirements from the respective car assembly lines, which are given in the form of numbers of each production type of engine to be supplied per successive fixed production periods (e.g., per shift or per day) to each of the car assembly lines. More particularly, a production period portion $P_i$ for an engine of each production type i is calculated from the input requirements. After a fixed value of $P_i$ has been calculated for an engine of each production type i, a production expectation value $X_{ij}$ for each production order j of each engine type i is calculated by the following equations:

$$X_{i1} = P_i \quad (1)$$

$$X_{ij} = X_{ij-1} + P_i - D_{ij-1} \quad (2)$$

where, $D_{ij}$ is a variable having the value 1 in a case where an engine of production type i is produced at production order j and taking the value 0 in other cases. In the prior art, a production order j is determined so as to produce an engine of the production type i having the highest value of $X_{ij}$.

For example, in an engine assembly line which receives requests from an A car assembly line to supply two a-type engines a day, from a B car assembly factory to supply one b-type engine a day, and a C car assembly factory to supply one c-type engine, a production order of the a-, b-, and c-type engines is determined in the following way. At first, a production period portion $P_A$ for the a-type engine is calculated by dividing the required number of a-type engines per production period (2 per day) by the sum of all a-, b-, and c-type engines required per production period: $2/(2+1+1)$. The resulting value of $P_A$ is 0.5. Similarly, a production rate $P_B$ of the b-type engine is 0.25, and a production rate $P_C$ of the c-type engine is 0.25. Therefore, from equation (1), $X_{a1}$ is 0.5, $X_{b1}$ is 0.25, and $X_{c1}$ is 0.25. Because the highest of these values is $X_{a1}$, it is determined that the first type of engine to be produced each day is the a-type engine.

Then, $X_{a2}$, $X_{b2}$, and $X_{c2}$ are calculated in the following manner:

$$X_{a2} = X_{a1} + 0.5 - 1 = 0$$

$$X_{b2} = X_{b1} + 0.25 - 0 = 0.5$$

$$X_{c2} = X_{c1} + 0.25 - 0 = 0.5$$

Because the highest of these values is $X_{b2}$ or $X_{c2}$, either $X_{b2}$ or $X_{c2}$, for example, $X_{b2}$, is chosen and the second engine to be produced each day is the b-type engine.

Similarly, $$X_{a3} = X_{a2} + 0.5 - 0 = 0.5$$

$$X_{b3} = X_{b2} + 0.25 - 1 = -0.25$$

$$X_{c3} = X_{c2} + 0.25 - 0 = 0.75$$

Because the highest of these values is $X_{c3}$, the third engine to be produced each day is the c-type engine.

Similarly, $$X_{a4} = X_{a3} + 0.5 - 0 = 1$$

$$X_{b4} = X_{b3} + 0.25 - 0 = 0$$

$$X_{c4} = X_{c3} + 0.25 - 1 = 0$$

Because the highest of these values is $X_{a4}$, the fourth engine to be produced each day is another a-type engine. Therefore, the engine production order for producing four engines a day is determined to be an order of a, b, c, and a.

With respect to the second day, $$X_{a5} = X_{a4} + 0.5 - 1 = 0.5$$

$$X_{b5} = X_{b4} + 0.25 - 0 = 0.25$$

$$X_{c5} = X_{c4} + 0.25 - 0 = 0.25$$

Because these values are equal to the values of $X_{a1}$, $X_{b1}$, and $X_{c1}$, respectively, the same order of engine production as that of the first day should be executed in the second day.

The reason why the above-described determination of a production order is possible is that $P_i$ can be calculated for the first day, and the same $P_i$ can be used for the second day, the third day, ..., and the n-th day without varying the $P_i$ value. More particularly, the above described determination of a production order is possible or effective only for a production line where input information is provided in the form of a number of products to be produced per fixed production period (e.g., each day) with respect to each production type, because the production period portion $P_i$ used in equations (1) and (2) is fixed.

However, in a production line, such as a complete knock down line (a packing line where parts are packed in a domestic country and are shipped to foreign countries), where input information for a production order schedule is given in the form of usually different specified periods of time of production (in the case of a packing line, specified periods of time of packing, that is, information about how many of what type of boxes should be packed within what periods of time), the prior art production order determining method cannot be used, because fixed values of $P_i$ cannot be used in the above equations (1) and (2).

SUMMARY OF THE INVENTION

An object of the invention is to provide a method for determining a production order of production of different product types which is effective even in a production line where production inputs are given in the form of specified production time periods with respect to production of each production type, with the production time periods having different possible values, both for products of the same type and for products of different types.

The above-described object is attained by a method for determining a production order in accordance with the present invention. The method comprises steps of providing production information in the form of a specified production time period and a number of products to be produced in the specified period with respect to production of each of a plurality of product types; calculating a production expectation value for each specified production time period, the production expectation value being defined as a number of products to be produced a day with respect to each of the product types, by dividing the number of products to be produced in each specified production time period by the number of days included in each specified production time period; summing the production expectation values for all specified production time periods for all the production types with respect to each day to calculate a total number of products to be produced with respect to each day; then integer-processing the total number of products to be produced with respect to each day; providing a table having a number of columns for each day equal to the integer-processed number of products to be produced that day; and then average processing to determine what product type should be inserted in each of the columns, and thereby to determine a production order for all the product types.

In the above-described method, since a production expectation value for each day (which corresponds to the number of products to be produced for each day) is calculated by summing the production expectation values for all specified production time periods for all the product types with respect to each day and then integer-processing the total number of products to be produced with respect to each day, it is possible to determine a production order. In this instance, the averaging process is necessary because the production period portions $P_{ij}$ change with respect to the production days, while the production period portions $P_i$ in the prior art method have constant values because they are not functions of the production order j.

BRIEF DESCRIPTION OF THE DRAWING

The above and other objects, features, and advantages of the present invention will become more apparent and will be more readily appreciated from the following detailed description of the preferred embodiment of the invention taken in conjunction with the accompanying drawings, in which.

DETAILED DESCRIPTION OF THE PREFERRED EMBODIMENT

A preferred embodiment of the present invention will now be explained with reference to the drawings.

Figure 1:
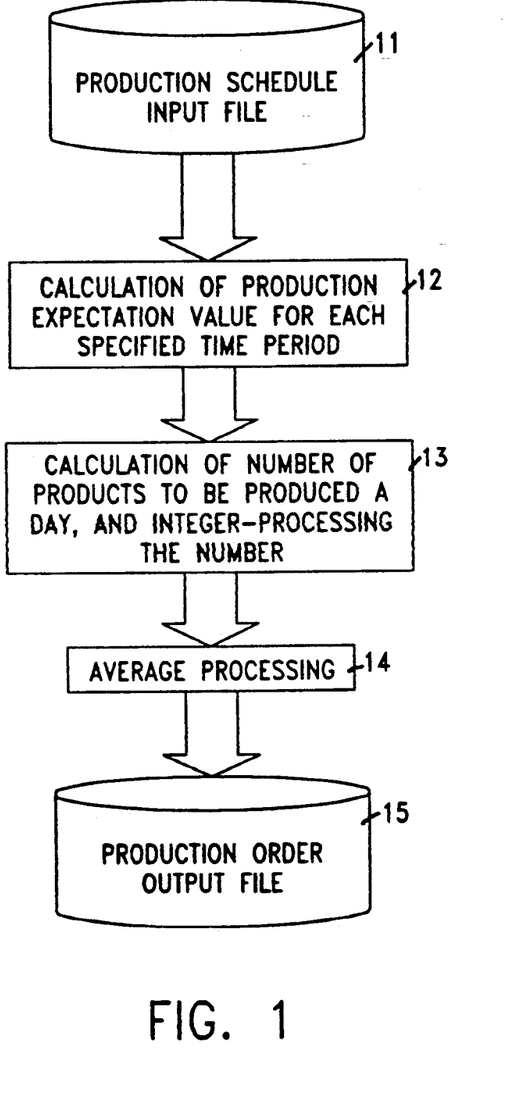
FIG. 1 is a diagram of a system for executing a production order determining method in accordance with one embodiment of the present invention.

As illustrated in FIG. 1, a production order determining method of the present invention includes step 11 of feeding production information into a production schedule input file, step 12 of calculating a production expectation value for each specified production time period, step 13 of summing the production expectation values and integer-processing the summed-up values, step 14 of applying an averaging process to determine a production order, and step 15 of storing the determined production order in a production order output file.

More particularly, the input information is fed to the production schedule input file 11 from outside, either manually by an operator or via a communication network, and is stored in the production schedule input file 11.

Figure 2:
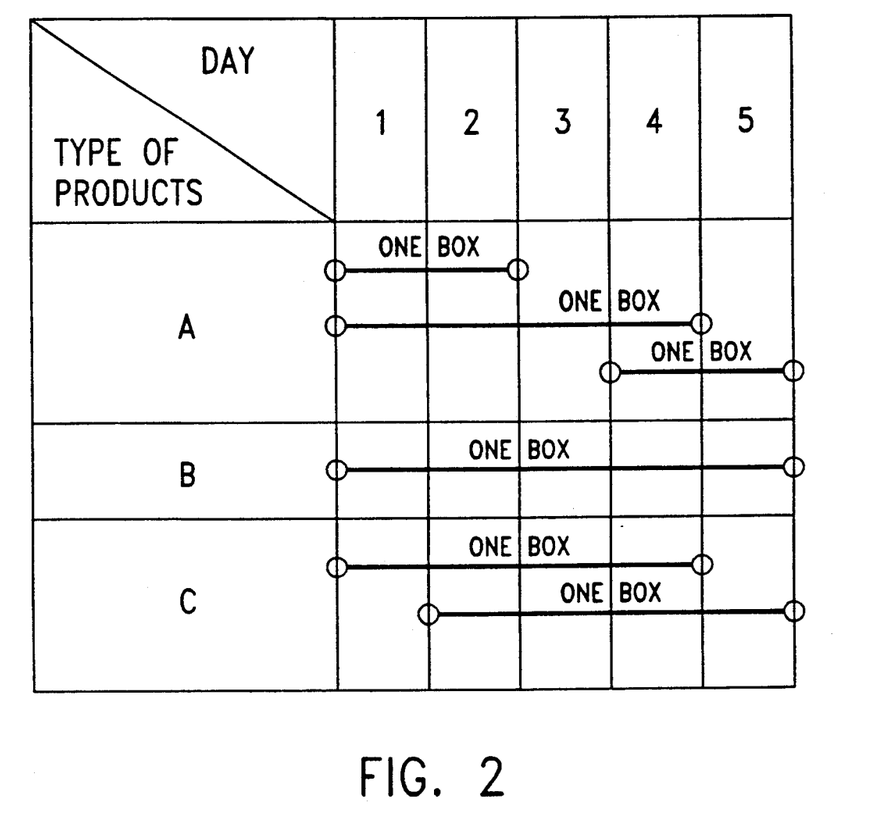
FIG. 2 is a table illustrating input information fed to a production schedule input file of the system of FIG. 1.

As illustrated in FIG. 2, the input information is given in the form of a specified production time period, for example, a specified packing time period in a case where the production line is a packing line. Hereinafter, such packing line will be taken for an example; therefore, "production" may be replaced by "packing". FIG. 2 illustrates an example where three boxes of products of an A type (e.g., products to be shipped to a country A) are to be packed. The first box is to be packed in two days (the first and second days of a five-day period), the second box in four days (the first through fourth days of the same period), and the third box in two days (the fourth and fifth days of the period). Also, one box of products of a B product type (products to be shipped to a country B) is to be packed in five days (the first through fifth days of the same five-day period), and two boxes of products of a C product type (products to be shipped to a country C) are to be packed, the first C-type box in four days (the first through fourth days of the same period), and the second C-type box also in four days (the second through fifth days of the period).

At step 12 of FIG. 1, a production (packing) expectation value for each specified production (packing) time period is calculated. The production expectation value is defined as a number of product portions to be produced (packed) a day with respect to each of a plurality of product (packing) types. This value is calculated by dividing the number of products to be produced (packed) in each specified production (packing) time period by the number of days in each specified production (packing) time period.

Figure 3:
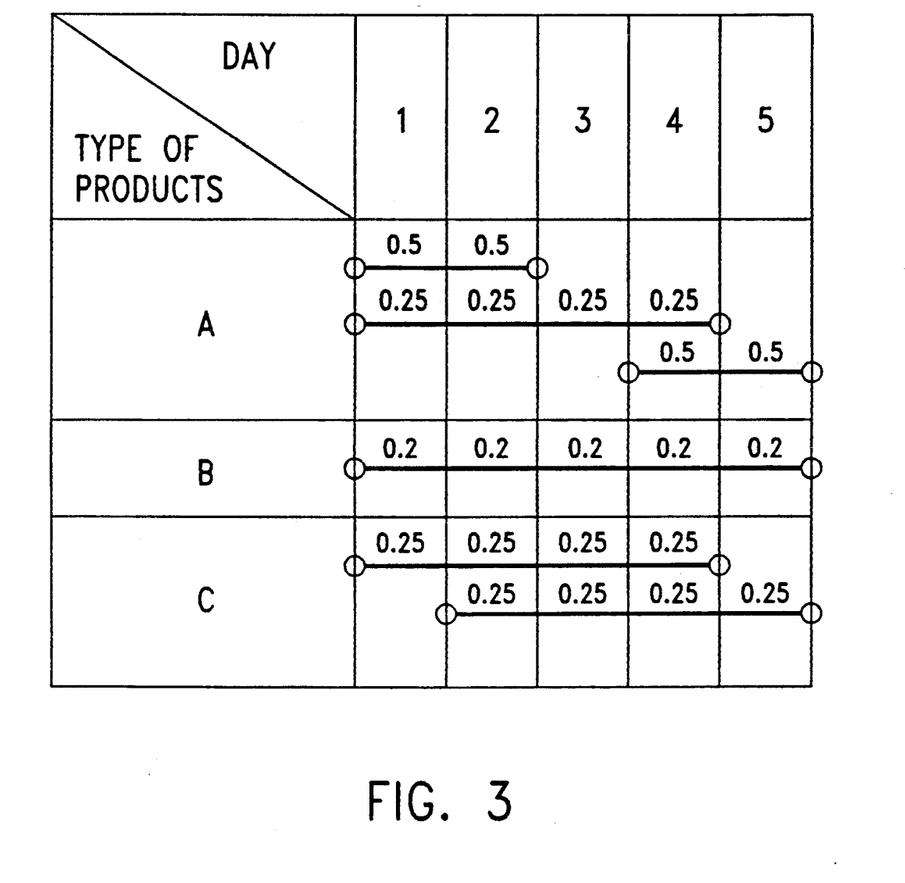
FIG. 3 is a table illustrating production expectation values for respective specified periods of time of production calculated from the input information shown in the table of FIG. 2.

For example, as illustrated in FIG. 3, the requirement of one A-type box to be produced (packed) in the first and second days is divided into 0.5 box for the first day and 0.5 box for the second day; so that the production (packing) expectation value on the first day for this A-type box is 0.5, and the production (packing) expectation value for first box on the second day is 0.5. The requirement of a second A-type box for the first through fourth days is divided into 0.25 box for the first day, 0.25 box for the second day, 0.25 box for the third day, and 0.25 box for the fourth day; so that the production (packing) expectation value on each day of the first through fourth days for this second A-type box is 0.25. The requirement of a third A-type box for the fourth and fifth days is divided into 0.5 box for the fourth day and 0.5 box for the fifth day; so that the production (packing) expectation value for this third A-type box on each of the fourth and fifth days is 0.5. Similarly, the same calculation is applied to the single box of products of the B type; so that the production (packing) expectation value for the one B-type box on each of the first through fifth days is 0.2. Finally, the same calculation is applied to the two boxes of products of the C type; so that the production (packing) expectation value for the first C-type box on each of the first through fourth days is 0.25, and the production (packing) expectation value for the second C-type box on each of the second through fifth days is 0.25.

Figure 4:
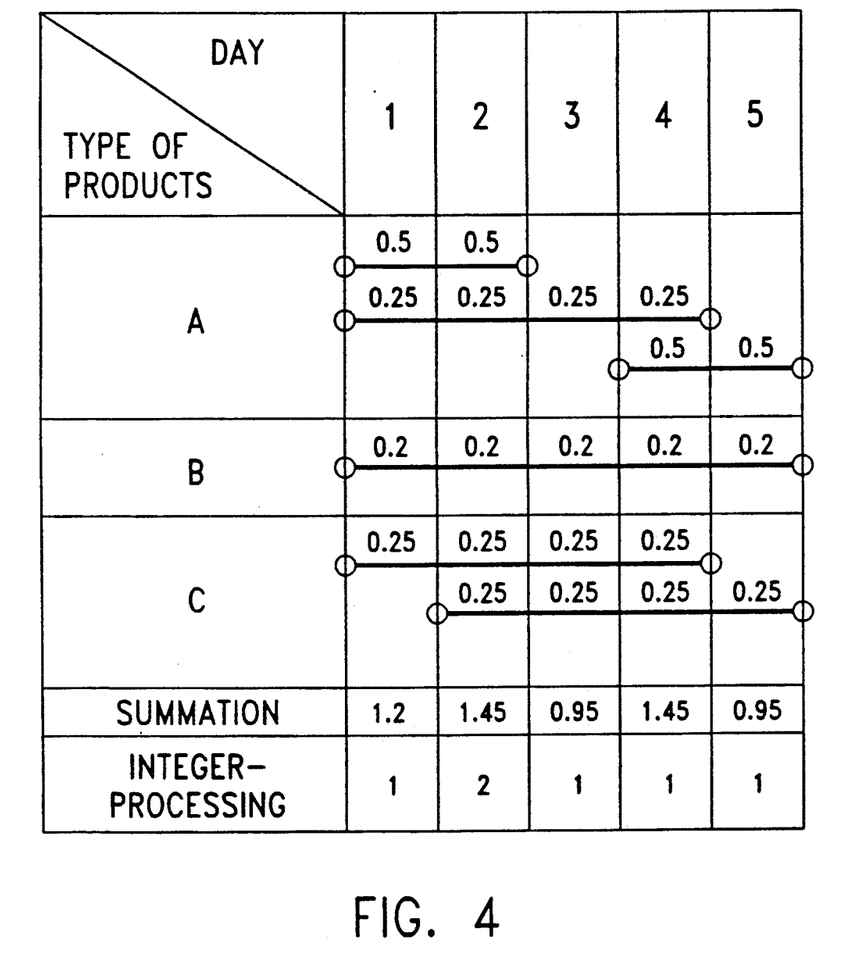
FIG. 4 is a table illustrating summed numbers of products to be produced each day calculated from the production expectation values shown in the table of FIG. 3 and the integer-processed values of the summed numbers of products to be produced each day.

Then, at step 13 of FIG. 1, and as illustrated in FIG. 4, the production expectation values for specified production (packing) time periods are summed for all the product types with respect to each day to obtain a total number of product portions to be produced (partial boxes to be packed) on each day of the five-day period. For example, in the first column, all of the production (packing) expectation values 0.5, 0.25, 0.2, and 0.25 are summed to obtain the total number 1.2 of product portions to be produced in the first day. Similarly, the totaled numbers of 1.45 for the second day, 0.95 for the third day, 1.45 for the fourth day, and 0.95 for the fifth day are obtained.

Then, at step 13 of FIG. 1, and as illustrated in FIG. 4, integer-processing is applied to each total number of product portions to be produced on each day. The integer-processing is executed by selecting the closest integer to the sum of the totaled number for the instant day and a remainder from the previous day. For example, because the total number 1.2 of the first day is closer to integer 1 than to integer 2, integer 1 is selected for the first day; that is, one box is produced (packed) on the first day. A difference of +0.2 between the total number 1.2 and the selected integer 1 is carried over as a remainder for the next day. With respect to the second day, the total number 1.45 of the instant day (the second day) and the remainder +0.2 from the previous day (the first day) are summed to obtain a number 1.65. Because the number 1.65 is closer to integer 2 than to integer 1, the integer 2 is selected for the second day; that is, two boxes are produced (packed) on the second day. The difference of −0.35 between the total number 1.65 and the selected integer 2 is carried over to the next day. With respect to the third day, the total of 0.95 for the third day and the remainder −0.35 from the second day are summed to obtain a number 0.6. Because the number 0.6 is closest to integer 1, the integer 1 is selected for the third day; so that one box is produced (packed) on the third day. The difference of −0.4 (=0.6− 1) is carried over to the next day. With respect to the fourth day, the total of 1.45 for the fourth day and the remainder −0.4 from the third day are summed to obtain a number 1.05. Because the number 1.05 is closest to integer 1, the integer 1 is selected for the fourth day; so that one box is produced for the fourth day. The difference of 0.05 (=1.05−1) is carried over to the next day. Similarly, with respect to the fifth day, the total number 0.95 for the fifth day and the remainder +0.05 from the fourth day are summed to obtain a number of 1.00, so that integer 1 is selected for the fifth day and one box is produced on the fifth day. In this way, the integer-processed numbers of products to be produced (packed) in the first, second, third, fourth, and fifth days are determined to be 1, 2, 1, 1, and 1, respectively.

Figure 5:
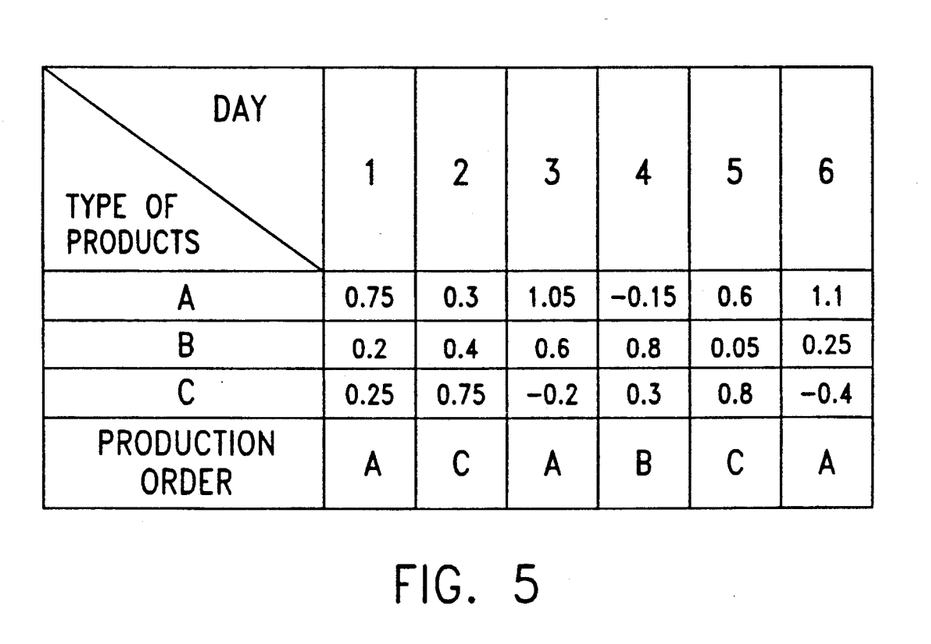
FIG. 5 is a table illustrating the results of average processing based on the data shown in the tables of FIGS. 3 and 4 and a production order determined by the averaging process.

Then, at step 14 of FIG. 1, and as illustrated in FIG. 5, an average process (a process for making production intervals even) is applied to the integer-processed numbers of products so that a production order of a plurality of product types is determined.

More particularly, FIG. 5 is a table having as many vacant columns as all of the integer-processed number of products to be produced (packed) in first through fifth days, with each column representing a production order. Thus, one column is allotted to each of the first day, the third day, the fourth day, and the fifth day, and two columns are allotted to the second day. The six columns are given production order numbers one through six. The first column number means the order of production (packing) of products to be produced (packed) in the first day. Similarly, the second column number and the third column number mean the order of production of products to be produced in the second day. The fourth column number means the order of production of products to be produced in the third day, the fifth column number means the order of production of products to be produced in the fourth day, and the sixth column number means the order of production of products to be produced in the fifth day. The production (packing) expectation values of the A-, B-, and C-product (packing) types are inserted below the six column numbers. Thus, in the example, the numbers 0.75, 0.2, and 0.25 below column number 1 are the respective production (packing) expectation values of the A-, B-, and C-types of boxes for the first day.

These production (packing) expectation values are obtained using the following equations:

$$X_{i1} = P_{i1} \tag{3}$$

$$X_{ij} = X_{ij\text{-}1} + P_{ij} - D_{ij\text{-}1} \tag{4}$$

where, $X_{ij}$ is a production (packing) expectation value for production of product (packing) type i and production (packing) order j, $P_{ij}$ is the sum of all production (packing) expectation values for each specified production time period with respect to production (packing) of product type i in a day on which product (packing) type i is to be produced in production (packing) order j, and $D_{ij}$ is a variable that is equal to the total number of all product portions to be produced on the day that contains the production (packing) order j and the production (packing) of type i products, and that is equal to 0 when there is no production (packing) of i-type product.

For example, in accordance with equation (3) and as illustrated in FIG. 5, the production (packing) expectation values $X_{A1}$, $X_{B1}$, and $X_{C1}$ in the case where the production (packing) order j is 1 are equal to $P_{A1}$, $P_{B1}$, and $P_{C1}$. In this instance, $P_{A1}$ is calculated to be 0.75, which is a summation of the production (packing) expectation values 0.5 and 0.25 (see FIG. 3) of the first day with respect to the production (packing) of the A-type of product. Similarly, $P_{B1}$ is calculated to be 0.2, which is the production expectation value 0.2 of the first day with respect to production (packing) of the B-type of product, and $P_{C1}$ is calculated to be 0.25, which is the production expectation value 0.25 of the first day with respect to the C-type of product. Then, since the largest of these production (packing) expectation values is 0.75, it is determined that the A-type of product should be produced (packed) in the order j=1.

Similarly, with respect to the order j=2, $$X_{A2}=X_{A1}+0.75-1.2=0.3$$

$$X_{B2}=X_{B1}+0.2-0=0.4$$

$$X_{C2}=X_{C1}+0.5-0=0.75$$

Since the largest value is 0.75, it is determined that the C-type of product should be produced (packed) in the order J=2. In this instance, the 0.75 in the equation for $X_{A2}$ is a summation of the production expectation values 0.5 and 0.25 (See FIG. 3) of the A-type of product with respect to the second day, and the 1.2 in the equation for $X_{A2}$ is the total number of products to be produced on the first day (see FIG. 4) and has to be subtracted in the equation for $X_{A2}$ because A-type product was produced (packed) in the first day. Similarly, in the equation for $X_{B2}$, the 0.2 is the production expectation value of the B-type of product with respect to the second day (see FIG. 3), and the 0 means that $D_{ij}$ is zero. In the equation for $X_{C2}$, the 0.5 is a summation of the 0.25 and 0.25 of production expectation values of the C-product type (see FIG. 3), and the 0 means that $D_{ij}$ is zero.

Similarly, with respect to the order j=3, $$X_{A3}=X_{A2}+0.75-0=1.05$$

$$X_{B3}=X_{B2}+0.2-0=0.6$$

$$X_{C3}=X_{C2}+0.5-1.45=-0.2$$

Since the largest of these expectation values is $X_{A3}$, the A-type of product is produced (packed) in the order j=3.

Similarly, with respect to the order j=4, $$X_{A4}=X_{A3}+0.25-1.45=-0.15$$

$$X_{B4}=X_{B3}+0.2-0=0.8$$

$$X_{C4}=X_{C3}+0.5-0=0.3$$

Since the largest of these expectation values is $X_{B4}$, the B-product type is produced (packed) in the order j=4.

Similarly, with respect to the order j=5, $$X_{A5}=X_{A4}+0.75-0=0.6$$

$$X_{B5}=X_{B4}+0.2-0.95=0.05$$

$$X_{C5}=X_{C4}+0.5-0=0.8$$

Since the largest of these expectation values is $X_{C5}$, the C-type of product is produced (packed) in the order j=5.

Finally, with respect to the order j=6, $$X_{A6}=X_{A5}+0.5-0=1.1$$

$$X_{B6}=X_{B5}+0.2-0=0.25$$

$$X_{C6}=X_{C5}+0.25-1.45=-0.4$$

Since the largest of these expectation values is $X_{A6}$, the A-product type is produced (packed) in the order j=6.

In this way, a production (packing) order is determined so that the A-type product is produced (packed) in the first day (j=1), the C-type product and then the A-type product are produced in the second day (j=2, 3), the B-type product is produced in the third day (j=4), the C-type product is produced in the fourth day (j=5), and the A-type product is produced in the fifth day (j=6). The above-described process for making production intervals as even as possible is called an averaging process.

In this averaging process, it is possible to calculate $P_{ij}$ because it is determined as a summation of production expectation values of the day that contains the order j. In this instance, $P_{ij}$ varies in accordance with the order j, while $P_i$ of the described prior art method is constant (i.e., is independent of the order j).

In accordance with the present invention, the following advantages are obtained.

First, a production order determining method which can satisfy both (a) production of products within a production time limit and (b) average processing (making production intervals as even as possible) is obtained, though the two production conditions are not compatible in the prior art.

Second, due to the above-described production condition (a), a required stock of products at a given production (packing) line is greatly decreased and a shutdown of a subsequent assembly line due to lack of supply of products is effectively prevented.

Third, due to the above-described production condition (b), a required stock of parts at a previous line is greatly decreased and a shutdown of the instant line due to lack of supply of parts is effectively prevented.

Figure 6:
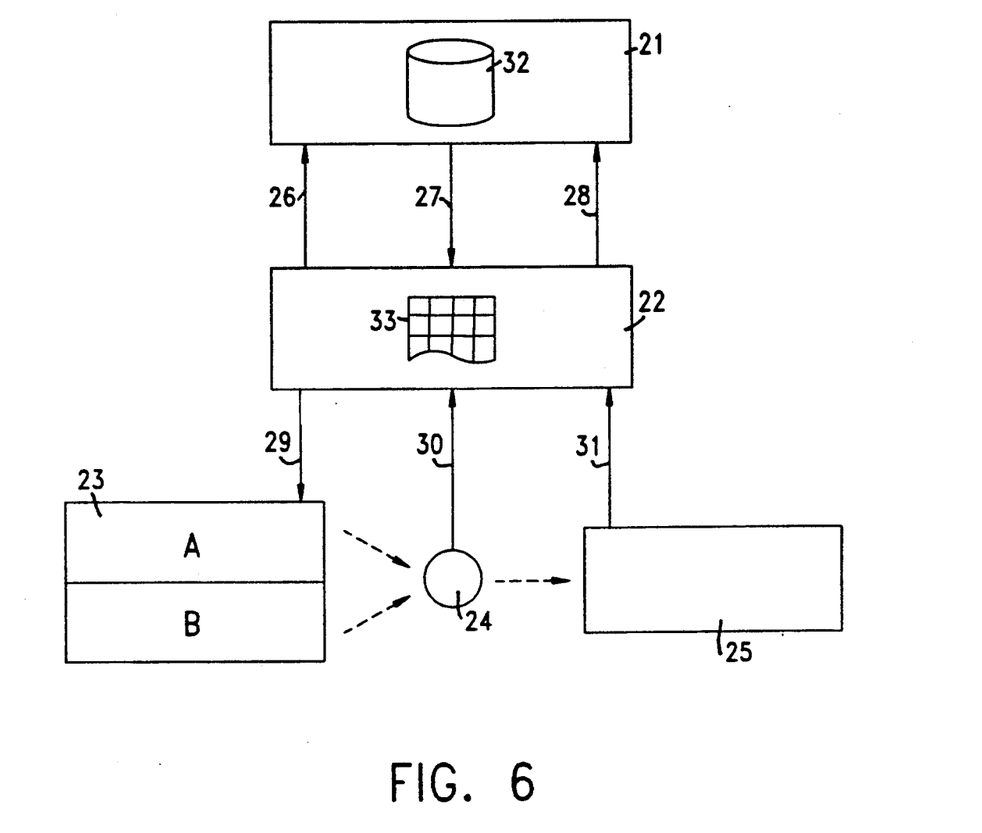
FIG. 6 is a block diagram of a production line controlling system in accordance with one embodiment of the present invention.

FIG. 6 shows a block diagram of a production line controlling system in accordance with one embodiment of the present invention. The production line controlling system includes a production order instructing apparatus 21, a stock control apparatus 22, a stock rack 23, a material insertion apparatus 24 and a production line 25. In the production line 25, various parts are coupled to a carried basic material in order to create a finished product from the carried material.

The production order instruct apparatus 21 is coupled to a production order file 32 which contains information concerning the production order determined by the method described in conjunction with FIG. 1. The stock control apparatus 22 includes a material information table 33 which converts information regarding the finished product to be produced into information regarding the material required to produce this product. The stock rack 23 is provided with a plurality of racks, each of which holds a respective basic material each of which may be used to produce one or more types of products. In addition, the stock rack 23 includes gates which are controlled by the stock control apparatus 22 so that a particular basic material may be picked from the stock rack 23 by the material insertion apparatus 24. The material insertion apparatus 24 picks up a particular basic material from the stock rack 23 and carries it to the production line 25. The material insertion apparatus 24 also includes an insertion sensor (not shown) which detects the proper functioning of the material insertion apparatus 24. The production line 25 produces or packs goods based on the order in which the basic materials are delivered to the production line 25 by the material insertion apparatus 24. The production line 25 also includes a line sensor (not shown) which detects whether or not a basic material is located in the front position of the production line 25.

In operation, after the material insertion apparatus 24 has finished inserting a basic material in the production line 25, the insertion sensor indicates that the material insertion apparatus 24 has completed the insertion operation. A material request signal 30 is then transmitted from the material insertion apparatus 24 to the stock control apparatus 22. When the stock control apparatus 22 has received the signal 30, the stock control apparatus 22 transmits a production order request signal 26 indicating a request for the next production order, to the production order instruct apparatus 21. The production order instruct apparatus 21 then selects, from the production order file 32, information regarding the next product which is to be produced. The production order instruct apparatus 21 generates a production order instruct signal 27 and transmits this signal to the stock control apparatus 22. The stock control apparatus 22 then selects the basic material required to produce the next product using the material information table 33. The stock control apparatus 22 also generates a rack change signal based on the basic material selected through the use of the material information table 33 and transmits this signal to the stock rack 23. The gates of the stock rack 23 are controlled in response to this signal and the material insertion apparatus 24 picks the basic material and carries it to the production line 25. The line sensor then generates a material detect signal indicative of the presence of a basic material at the front position of the production line 25. This signal is transmitted to the stock control apparatus 22 which then transmits an insertion signal 28 to the production order instruct apparatus 21. This cycle is repeated until such time as a production order instruct signal 27 is no longer transmitted.

Although only one embodiment of the invention has been described in detail above, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the present invention as defined by the following claims.

What is claimed is:

1. A method for controlling a production apparatus comprising the steps of:
   providing production information in the form of a specified production time period and a number of products to be produced in the specified production time period with respect to each of a plurality of product types;
   calculating a first production expectation value for each specified production time period to be produced a day with respect to each of the product types, by dividing the number of products to be produced in each specified production time period by a number of days included in the respective specified production time period;
   summing the first production expectation values in each specified production time period for all the product types with respect to each day to calculate a total number of products to be produced each day, and then integer-processing the total number of products to be produced each day;
   generating a production order sequence providing as many production orders for each day as the integer-processed number of products to be produced on that day, and then average-processing production intervals by summing the production expectation values for each respective product type to determine what product type should be produced in each production order; and
   controlling a production apparatus to transfer a material to a production line based on the production order sequence generated, and producing the ordered product.

2. A method for controlling a production apparatus according to claim 1, wherein the integer-processing is executed by selecting an integer closest to a sum of the total number of product portions to be produced on a given day and a remainder from the previous day which is defined as the difference between the selected integer of the previous day and the number of product portions to be produced on the previous day.

3. A method for controlling a production apparatus according to claim 1, wherein the averaging process comprises:
   (a) calculating production expectation values using the following equations:

$$X_{i1} = P_{i1}$$

$$X_{ij} = X_{ij-1} + P_{ij} - D_{ij-1}$$

where,
   $X_{ij}$ is a production expectation value for production of product type i and production order j,
   $P_{ij}$ is the sum of all production expectation values for each specified production time period with respect to production of product type i in a production day which includes the production of product type in the production order j, and
   $D_{ij}$ is a variable that is equal to a total number of product portions to be produced on the day that contains the production order j and the production of i-type products and is equal to 0 when there is no production of i-type products; and
   (b) selecting the largest $X_{ij}$ among the $X_{ij}$s having the same production order number j to determine the product type i to be produced in the production order j.

4. A method for controlling a production apparatus according to claim 1, wherein the production order is a packing order.

5. A method for controlling a production apparatus according to claim 1, wherein the production order is a packing order in a complete knock down engine assembly line.

6. A method for controlling a production apparatus according to claim 1 wherein production information is input from a production schedule file.

7. A method for controlling a production apparatus according to claim 1, further comprising the step of inputting the production order to a production file.

8. A method for controlling a production apparatus according to claim 1, wherein the step of generating a production order sequence includes the step of employing a conversion table to convert the production order sequence to product type information and then transmitting this product type information to the production apparatus.

9. A method for controlling a production apparatus comprising the steps of:
- providing production information in the form of a specified production time period and a number of products to be produced in the specified production time period with respect to each of a plurality of product types:
- calculating a first production expectation value for each specified production time period to be produced a day with respect to each of the product types by dividing the number of products to be produced in each specified production time period by a number of days included in the respective specified production time period;
- summing the first production expectation values in each specified production time period for all the product types with respect to each day to calculate a total number of products to be produced each day, and then integer-processing the total number of products to be produced each day;
- generating a production order sequence providing as many production orders for each day as the integer-processed number of products to be produced on that day;
- calculating a second production expectation value for production of each product type and each production order using the following equations:

$$X_{i1} = P_{i1}$$

$$X_{i1} = X_{ij-1} + P_{ij} - D_{ij-1}$$

wherein $X_{ij}$ is a second production expectation value for production of product type i and production order j;

wherein $P_{ij}$ is the sum of all first production values for each specified production time period with respect to production of product type i in a day on which product type i is to be produced in production order j, and varies in accordance with the order j;

wherein $D_{ij}$ is a variable that is equal to the total number of products to be produced on the day that contains the production order j and the production of product type i, and wherein $D_{ij}$ is equal to zero when there is no production of product type i;

- determining that a product type which has the largest second production expectation value in each production order should be produced in the production order; and
- controlling a production apparatus to transfer a material to a production line based on the production order sequence generated, and producing the ordered product.

* * * * *

UNITED STATES PATENT AND TRADEMARK OFFICE
CERTIFICATE OF CORRECTION

PATENT NO. : 5,327,340

DATED : July 5, 1994

INVENTOR(S) : Kuniya KANEKO, et al.

It is certified that error appears in the above-identified patent and that said Letters Patent is hereby corrected as shown below:

Column 9, line 56, delete "first".

Column 9, line 63, delete "first".

Signed and Sealed this

Fifteenth Day of November, 1994

Attest:

BRUCE LEHMAN

Attesting Officer

Commissioner of Patents and Trademarks